United States Patent [19]

Herman et al.

[11] 4,420,580

[45] Dec. 13, 1983

[54] METHOD FOR PREPARING FILLED POLYOLEFIN RESINS AND THE RESIN MADE THEREFROM

[75] Inventors: Jim T. Herman; Kenneth L. Bryce, both of Angleton; Gerald M. Lancaster, Surfside, all of Tex.

[73] Assignee: The Dow Chemical Company, Midland, Mich.

[21] Appl. No.: 346,806

[22] Filed: Feb. 8, 1982

[51] Int. Cl.$^3$ .............................. C08K 3/20; C08K 326; C08L 23/04; C08F 20/06

[52] U.S. Cl. .................................. 524/424; 524/425; 524/432; 524/433; 524/436; 524/522; 524/556; 525/221

[58] Field of Search ............... 524/522, 424, 425, 432, 524/433, 436, 556; 525/221

[56] References Cited

U.S. PATENT DOCUMENTS

| | | | |
|---|---|---|---|
| 3,264,272 | 8/1966 | Rees | 428/36 |
| 3,322,734 | 5/1967 | Rees | 525/326 |
| 3,404,134 | 10/1968 | Rees | 525/362 |
| 3,649,578 | 3/1972 | Bush et al. | 525/221 |
| 3,709,957 | 1/1973 | Brebner | 525/221 |
| 3,966,672 | 6/1976 | Gaylord | 525/221 |
| 4,031,062 | 6/1977 | Shirayama et al. | 156/334 |
| 4,191,798 | 3/1980 | Schumacher et al. | 524/522 |
| 4,263,196 | 4/1981 | Schumacher et al. | 524/425 |
| 4,303,573 | 12/1981 | Ostapchenko | 525/78 |

FOREIGN PATENT DOCUMENTS

| | | | |
|---|---|---|---|
| 55-71733 | 5/1980 | Japan | 525/221 |
| 55-131031 | 10/1980 | Japan | 525/221 |

OTHER PUBLICATIONS

Derwent Abst. 82585D/45 (J56122816)9–1981 Tokuyama.
Derwent Abst. 54323 C/31 (J55080450) 6-1980 DJK.
Derwent Abst. 92119A/51 (11–1978) Sumitomo J53130743.
Derwent Abst. 92120 A/51 (11–1978) Sumitono J53130744.
Derwent Abst. 91836 D/50 (10–1981) Mitsu J56139547.

*Primary Examiner*—Melvyn I. Marquis
*Assistant Examiner*—Herbert J. Lilling
*Attorney, Agent, or Firm*—Bruce M. Kanuch; S. S. Grace

[57] ABSTRACT

The detrimental effect of inorganic metal fillers on impact strength of polyolefin resins is substantially reduced by the addition of a copolymer of ethylene and an alpha-, beta-ethylenically unsaturated carboxylic acid, such as ethylene-acrylic acid, to a melt blend of the polyolefin resin containing the inorganic filler. The addition of the ethylene copolymer provides an effective means to compatibilize or couple the filler into the polyolefin resin.

12 Claims, No Drawings

METHOD FOR PREPARING FILLED POLYOLEFIN RESINS AND THE RESIN MADE THEREFROM

BACKGROUND OF THE INVENTION

The present invention relates to polyolefin resins containing inorganic fillers and particularly to the method of preparing such filled resins wherein the product so produced has an unexpected reduction in loss of impact strength.

Fillers, such as inorganic metal oxides and carbonates, have long been used as additives to polymer resins to improve certain physical properties, to tailor such resins for particular end use, or to reduce the amount of resin required for a particular fabricated article. Polyolefin resins containing inorganic metal fillers generally have increased stiffness of modulus, improved dimensional stability, increased compressive strength, and improved creep resistance over the unfilled resin. However, other physical properties of polyolefin resins, such as impact strength, are detrimentally affected by the addition of fillers. These property losses are due, at least in part, to the incompatibility between the filler and the base polyolefin resin.

It has been suggested to use coupling or bonding agents in the manufacture of filled polymer resin systems to compatibilize or couple the filler with the base resin. This frequently requires pretreatment of the filler with organic compounds such as organic titanates or silanes followed by blending of the treated filler with the base resin. The effectiveness of these coupling agents in polyolefin resins has been quite limited since the suggested coupling agents do not react to any significant extent with the base polymer resin. Reduction in loss of impact strength, for example, is not obtained.

SUMMARY OF THE INVENTION

The present invention relates to a method of compatibilizing certain inorganic metal fillers with a polyolefin resin. Such compatibilization is achieved by the addition of a copolymer of ethylene and an alpha-, beta-ethylenically unsaturated carboxylic acid to a melt of a polyolefin resin containing the inorganic metal filler. By this method the loss in impact strength normally obtained by the addition of the filler material is substantially reduced.

The term "inorganic metal filler" as used herein refers to any polyvalent inorganic metal oxide, hydroxide or salt which reacts with the acid moiety of ethylene-acid copolymer.

Another aspect of the present invention is a method for preparing filled polyolefin resins which comprises forming a melt of a polyolefin resin; blending into the melt an inorganic metal filler and a copolymer of ethylene and an alpha-, beta ethylenically unsaturated carboxylic acid; and solidifying the resultant melt blend to form a filled polyolefin resin.

Still another embodiment of the present invention is a filled polyolefin resin composition which comprises by weight, based upon the total weight of the composition, from about 1 to about 60 percent inorganic metal filler, from about 0.5 to about 30 percent of a copolymer of ethylene and an alpha-, beta-ethylenically unsaturated carboxylic acid, and a polyolefin resin, wherein the total amount of the filler and ethylene copolymer is within the range of from about 5 to about 60 percent.

By melt blending the ethylene copolymer (as defined herein) the inorganic filler is compatibilized or coupled with the base polyolefin resin so as to significantly reduce the loss in physical properties such as impact strength. This result is achieved without the necessity of pretreating the inorganic metal filler, and without the introduction into the polymer system of extraneous metal ions as is the case of titanate coupling agents or other functional groups such as the organic silanes.

DETAILED DESCRIPTION OF THE INVENTION

As used herein the term "polyolefin resin" includes ethylene homopolymers such as low density polyethylene, high density polyethylene and polypropylene, olefin copolymers such as copolymers of ethylene and propylene, ethylene and higher alkenes which are the so-called linear low density polyethylenes, and mixtures of the above homopolymers or copolymers. Homopolymers and copolymers of ethylene or propylene are preferred.

Specific inorganic metal fillers include magnesium oxide, calcium oxide, zinc oxide, calcium carbonate, magnesium carbonate, magnesium hydroxide, zinc hydroxide, and the like. Preferred inorganic metal fillers are the oxides, carbonates and hydroxides of the Group II metals of the periodic table of the elements.

These inorganic metal fillers are normally added to the polyolefin resins in a solid particulate form. The filler may be dry blended into the polyolefin resin or into a mixture of the polyolefin resin and the ethylene copolymer for long term storage, or may be metered into the blending equipment at the time of processing.

In accordance with the present invention, the polyolefin resin to be filled is formed into a melt. This can be accomplished for example by remelting solid particulate resin or utilizing a resin which is already in the melt stage from previous processing. If the inorganic metal filler and the copolymer of ethylene and the alpha-, beta-ethylenically unsaturated carboxylic acid have not been previously dry blended into the polyolefin resin, they are then blended into the melt. The order of addition of the two components is not critical to the invention. They can be added in either order or simultaneously.

The copolymer of ethylene and alpha-, beta-ethylenically unsaturated carboxylic acid refers to a copolymer of a major portion of ethylene and a minor portion, typically from 0.5 to 30 percent by weight, of the alpha-, beta-ethylenically unsaturated carboxylic acid. The carboxylic acid monomer preferably is one having from 3 to 8 carbon atoms per molecule. Specific examples include acrylic acid, methacrylic acid and crotonic acid. The copolymer can also contain other copolymerizable monomers such as an ester of acrylic acid. The comonomers can be combined in the copolymer in any way, for example, as random copolymers, as block or sequential copolymers, or graft copolymers. These ethylene copolymers and methods of manufacture are readily known in the art. The preferred copolymer of the present invention is ethylene acrylic acid copolymer, particularly the copolymer containing acrylic acid in the amount within the range of from about 2.5 to about 20 weight percent and most preferably from 6 to 15 weight percent. These ethylene carboxylic acid copolymers have a wide range of melt index as well as acid content. In the present invention, copolymers of lower melt index, for example 1–10 M.I., are most preferred.

The blending of the polyolefin resin, the ethylene copolymer and inorganic metal filler can be achieved in a variety of conventional methods such as through the use of a hot roll mill, screw extruder, high intensity mixer, or other blending equipment. The resin melt should be at a temperature above the melting point of the ethylene copolymer additive employed. The blending should be carried out for time sufficient to allow reaction between the ethylene copolymer and the inorganic filler. This can be detected by the formation of byproducts such as water or carbon dioxide and by the reduction in loss of impact strength of the resultant filled polyolefin resin. Typical blending time is from about 1 minute to about 30 minutes.

Once the ethylene copolymer and inorganic metal filler are blended into the polyolefin resin with sufficient time for reaction, the resultant melt blend is solidified and the filled resin thereafter used to form a wide range of fabricated articles, for example, injection molded parts or cast or blown films. Within the scope of the present invention, such filled resin preferably comprises by weight, based on the total resin composition, from about 10 to about 30 percent of the inorganic metal filler, and from about 1 to about 10 percent of the ethylene-alpha, beta-ethylenically unsaturated carboxylic acid copolymer and from about 60 to about 89 percent of a polyolefin resin.

The filled resin composition of the present invention can also include other components which do not detrimentally affect the coupling or compatibilizing action of the ethylene copolymer with the inorganic metal filler. These additives include, for example, pigments, antioxidants, other fillers and the like.

EXAMPLES

A number of compression-molded samples were prepared from filled polyolefin resins as described below. The samples tested were compression molded in accordance with ASTM procedure D-1928. The reported Izod impact and flexural modulus measurements were taken in accordance with ASTM test D-256 and D-970, respectively. Compositions are reported as parts by weight based on 100 parts of polyolefin resin, e.g., Example 1 composition had 10 parts MgO and 5 parts EAA per 100 parts of polyethylene.

Examples 1-28 were prepared from filled polyolefin resin using a steam-heated, two-roll mill blending device. The temperature of the first roll was 390° F. and of the second roll was 73° F. The roll speed of the first roll was 29 rpm and of the second roll was 32 rpm. The gap between the two rolls was varied between 80 to 125 mils to provide sufficient shear mixing. The polyolefin resin was allowed to melt on the roll mill until an even melt consistency was observed at the nip. Once melted, the particulate solid filler was added to the melt and blended. The ethylene copolymer was then added to the roll mill and blended for approximately 5 minutes to allow reaction between the ethylene copolymer and the filler to occur. The homogeneously blended composition was then removed from the roll mill and allowed to cool. The resultant filled resin was ground or chopped into small particles and compression molded into samples for physical property testing as noted above.

EXAMPLES 1-6

Using the roll mill technique described above, a series of filled resins were prepared from the following components: a high density polyethylene homopolymer (produced in a solution polymerization process) having a density of 0.962 grams per cubic centimeter and a melt index of 10; a high surface area technical grade magnesium oxide particulate filler available as Maglite A from Merck and Company, Inc.; and an ethylene-acrylic acid copolymer having a melt index of 11 and containing 3 percent by weight of acrylic acid. Table I contains data regarding sample composition and test results on the compression molded samples for Izod impact and flexural modulus.

TABLE I

| Example | HDPE | MgO | EAA | Notched Izod Impact (ft-lb/in) | Flexural Modulus (psi) |
|---|---|---|---|---|---|
| Comparative A | 100 | 0 | 0 | 0.80 | 210,000 |
| Comparative B | 100 | 10 | 0 | 0.37 | 241,000 |
| Comparative C | 100 | 20 | 0 | 0.30 | 303,000 |
| Comparative D | 100 | 30 | 0 | 0.33 | 326,000 |
| 1 | 100 | 10 | 5 | 0.61 | 226,000 |
| 2 | 100 | 10 | 10 | 0.86 | 200,000 |
| 3 | 100 | 20 | 5 | 0.52 | 254,000 |
| 4 | 100 | 20 | 10 | 0.78 | 220,000 |
| 5 | 100 | 30 | 5 | 0.40 | 304,000 |
| 6 | 100 | 30 | 10 | 0.59 | 245,000 |

As can be seen from the Comparative Examples, the addition of even 10 parts of magnesium oxide filler substantially reduces the impact strength of the base resin. Further additions of the filler reduce the impact strength even further. However, when the ethylene-acrylic acid copolymer is employed as a coupling agent to compatibilize the magnesium oxide with the high density polyethylene resin, the reduction in notched impact strength is substantially less—compare Example B with Example 1, Example C with Example 3, and Example D with Example 5. In addition, some increase in stiffness was obtained as evidenced by increased flexural modulus.

EXAMPLES 7-11

In the same manner as Examples 1-6, an additional series of filled resins were prepared from a high density polyethylene (produced in a solution polymerization process) containing 5 percent propylene comonomer, having a density of 0.952 and a melt index of 5; a small particle size high purity technical grade magnesium oxide available as Magox 98HR Fine from Basic Chemicals; and an ethylene-acrylic acid copolymer containing 10 percent of acrylic acid and a melt index of 10. Table II contains the composition of the filled resins and the resultant impact strength and flexural modulus data.

TABLE II

| Example | HDPE | MgO | EAA | Notched Izod Impact (ft-lb/in) | Flexural Modulus (psi) |
|---|---|---|---|---|---|
| Comparative E | 100 | 0 | 0 | 0.97 | 184,000 |
| Comparative F | 100 | 10 | 0 | 0.92 | 188,000 |
| Comparative G | 100 | 20 | 0 | 0.77 | 200,000 |
| Comparative H | 100 | 30 | 0 | 0.54 | 234,000 |
| 7 | 100 | 10 | 10 | 1.10 | 177,000 |
| 8 | 100 | 20 | 5 | 0.91 | 200,000 |
| 9 | 100 | 20 | 10 | 0.96 | 172,000 |
| 10 | 100 | 30 | 5 | 0.79 | 214,000 |
| 11 | 100 | 40 | 10 | 1.08 | 192,000 |

The same effect noted in Examples 1-6 is present in this series of examples utilizing a different polyolefin resin, magnesium oxide source, and ethylene-acrylic acid copolymer. The detrimental effect of the addition of magnesium oxide filler on impact strength is substantially moderated by the use of ethylene-acrylic acid copolymer to compatibilize the filler with the base polyethylene resin.

EXAMPLES 12-17

In the same manner as Examples 1-6, a still further series of filled resin compression-molded samples were prepared using a high density polyethylene (produced in a slurry polymerization process) having a melt index of 1.2 and a density of 0.965. A high surface area technical grade magnesium oxide available as Maglite D from Merck and Company, Inc. and an ethylene-acrylic acid copolymer containing 10 weight percent acrylic acid and having a melt index of 10 were employed. Table III shows the composition and resultant impact and flexural modulus test data.

TABLE III

| Example | HDPE | MgO | EAA | Notched Izod Impact (ft-lb/in) | Flexural Modulus (psi) |
|---|---|---|---|---|---|
| Comparative I | 100 | 0 | 0 | 2.04 | 212,000 |
| Comparative J | 100 | 10 | 0 | 0.65 | 214,000 |
| Comparative K | 100 | 20 | 0 | 0.45 | 269,000 |
| Comparative L | 100 | 30 | 0 | 0.41 | 306,000 |
| 12 | 100 | 10 | 5 | 1.34 | 197,000 |
| 13 | 100 | 10 | 10 | 1.69 | 197,000 |
| 14 | 100 | 20 | 5 | 0.82 | 241,000 |
| 15 | 100 | 20 | 10 | 1.20 | 213,000 |
| 16 | 100 | 30 | 5 | 0.68 | 229,000 |
| 17 | 100 | 30 | 10 | 1.16 | 228,000 |

The adverse effect of the addition of magnesium oxide filler on the Izod impact of the resultant resin composition was substantially moderated by the addition of the ethylene-acrylic acid compatibilizer. For example, compare Example J with Example 12 and 13.

EXAMPLES 18-23

In the same manner as Examples 1-6, another series of filled high density polyethylene resins was prepared and compression molded using a high density polyethylene resin (produced in a slurry polymerization process) containing 2 percent butene comonomer, having a melt index of 5 and a density of 0.954 g/cm³, the magnesium oxide of Examples 7-11, and the ethylene-acrylic acid copolymer of Examples 1-6. Table IV presents the formulations and resultant impact and flexural modulus test data.

TABLE IV

| Example | HDPE | MgO | EAA | Notched Izod Impact (ft-lb/in) | Flexural Modulus (psi) |
|---|---|---|---|---|---|
| Comparative M | 100 | 0 | 0 | 0.73 | 187,000 |
| Comparative N | 100 | 10 | 0 | 0.68 | 216,000 |
| Comparative O | 100 | 20 | 0 | 0.45 | 229,000 |
| Comparative P | 100 | 30 | 0 | 0.40 | 272,000 |
| 18 | 100 | 10 | 5 | 0.70 | 186,000 |
| 19 | 100 | 10 | 10 | 0.81 | 161,000 |
| 20 | 100 | 20 | 5 | 0.62 | 214,000 |
| 21 | 100 | 20 | 10 | 0.89 | 175,000 |
| 22 | 100 | 30 | 5 | 0.56 | 237,000 |
| 23 | 100 | 30 | 10 | 0.81 | 200,000 |

The moderating influence of the addition of ethylene-acrylic acid copolymer to a melt blend of high density polyethylene and magnesium oxide filler was observed. For example, compare Example O with Examples 20 and 21.

EXAMPLE 24

A melt blend of high density polyethylene (1.2 melt index; 0.965 density), 25 weight percent magnesium oxide particulate based on the total weight of the resin composition, and 5 weight percent of an ethylene-acrylic acid copolymer containing 3 percent acrylic acid (11 melt index) was prepared on the roll mill as previously described and the resultant filled polymer tested for impact strength. The Izod impact of the base resin was 2.63 ft-lb/in. The Izod impact of the magnesium oxide containing resin without acrylic acid addition dropped to 0.48 ft-lb/in. The sample within the scope of the present invention containing both the magnesium oxide and the ethylene acrylic acid copolymer showed substantially less reduction in Izod impact. This example had an Izod impact of 1.88 ft-lb/in.

EXAMPLES 25-26

The same beneficial effect was noted when an ethylene-acrylic acid copolymer (11 melt index and 3 weight percent acrylic acid) was melt blended with polypropylene homopolymer resin containing magnesium oxide particulate filler. Because polypropylene is notch sensitive, the test generated from the notched Izod impact test was not an appropriate test to measure differences among the polypropylene samples. However, when a Gardner Impact Test was employed, the filled resin samples containing ethylene-acrylic acid had improved impact resistance over the filled polypropylene resin containing no ethylene acrylic acid copolymer. In fact, based on the mode of failure the filled polypropylene resin containing the ethylene acrylic acid copolymer had better impact resistance than the base polypropylene resin containing no additives. See Table V.

TABLE V

| Example | PP | MgO | EAA | Gardner Impact (in/lb) | Failure Description |
|---|---|---|---|---|---|
| Comparative Q | 100 | 0 | 0 | 8 | Brittle; shattered at failure |
| Comparative R | 100 | 10 | 0 | 6 | Cracked without shattering |
| 25 | 100 | 10 | 5 | 8 | Dimpled without cracking or shattering |
| 26 | 100 | 10 | 10 | 9 | Dimpled without cracking or shattering |

EXAMPLES 27-29

A series of samples were prepared from high density polyethylene, calcium carbonate filler and ethylene-acrylic acid copolymer. Table VI reports the compositions of the samples and the resultant impact test data.

TABLE VI

| Example | HDPE | Calcium Carbonate | EAA | Izod Impact (ft-lb/in) |
|---|---|---|---|---|
| Comparative S | 100 | 0 | 0 | 0.96 |
| Comparative T | 100 | 33.3 | 0 | 0.47 |
| 27 | 100 | 33.3 | 1 | 0.56 |
| 28 | 100 | 33.3 | 3 | 0.57 |
| 29 | 100 | 33.3 | 5 | 0.61 |

The compatibilizing effect of the ethylene acrylic acid is observed with respect to calcium carbonate filler in high density polyethylene. For example, compare Example T with Example 27.

EXAMPLES 30-34

Another series of samples were prepared from filled resins which were compounded using a twin screw extruder. The extruder blending conditions were 200 rpm screw speed, 80-90 torque, 90-100 pounds per hour through-put. The temperature profile of the screw extruder ranged from a temperature of 300° F. at the beginning to a maximum of 430° F. in the middle to 350° F. at the exit. In order to remove the water formed as a result of the coupling reaction between the ethylene copolymer and the filler (as well as absorbed water liberated from the filler surface), a vacuum of 30 psig pressure was drawn for proper devolatilization.

The samples were made by melt blending in the twin screw extruder an ethylene-acrylic acid copolymer (3 weight percent acid; 11 M.I.) and magnesium oxide particulate (Maglite D) with each of the types of high density polyethylene resins noted in the previous examples. The Izod impact test results showed substantially less reduction in impact strength than the same resins containing only the magnesium oxide (Table VII).

TABLE VII

| Example | MgO | EAA | Izod Impact (ft-lb/in) |
|---|---|---|---|
| Comparative A* | 0 | 0 | 0.80 |
| C* | 20 | 0 | 0.30 |
| 30* | 20 | 5 | 0.64 |
| Comparative I** | 0 | 0 | 2.04 |
| J** | 10 | 0 | 0.65 |
| K** | 20 | 0 | 0.45 |
| 31** | 10 | 5 | 1.50 |
| 32** | 20 | 5 | 1.00 |
| Comparative M*** | 0 | 0 | 0.73 |
| N*** | 10 | 0 | 0.68 |
| O*** | 20 | 0 | 0.45 |
| 33*** | 10 | 5 | 0.81 |
| 34*** | 20 | 5 | 0.70 |

*10 Melt Index, 0.962 density homopolymer (solution polymerization) - 100 parts
**1.2 Melt Index, 0.965 density homopolymer (slurry polymerization) - 100 parts
***5 Melt Index, 0.954 density butene copolymer (slurry polymerization) - 100 parts

What is claimed is:

1. A method of preparing filled polyolefin resins which consisting essentially of forming a melt of a polyolefin resin; blending into the melt an inorganic metal filler which is any polyvalent inorganic metal oxide, hydroxide or salt which reacts with the acid moiety of an ethylene-acid copolymer and a copolymer of ethylene and an alpha-, beta-ethylenically unsaturated carboxylic acid; and solidifying the resultant melt blend to form a filled polyolefin resin.

2. The method of claim 1 wherein the polyolefin is an ethylene or propylene homopolymer or copolymer.

3. The method of claim 1 wherein the filler is an oxide, carbonate, or hydroxide of the Group II metals of the periodic table of the elements.

4. The method of claim 1 wherein the copolymer is ethylene-acrylic acid containing from about 2.5 to about 20 weight percent acrylic acid.

5. A filled polyolefin resin composition formed by the process of claim 1 wherein, based on the total weight of the composition, the inorganic filler is present in an amount of from about 1 to about 60 weight percent, the copolymer is present in an amount of from about 0.5 to about 30 percent, and the balance a polyolefin, wherein the total amount of particulate and copolymer is within the range of from about 5 to about 60 percent.

6. The composition of claim 5 wherein the copolymer is ethylene-acrylic acid containing from about 2.5 to about 20 weight percent acrylic acid.

7. The composition of claim 5 wherein the filler is an oxide, carbonate, or hydroxide of the Group II metals of the periodic table of elements.

8. A method of reducing a loss in impact strength of a polyolefin resin filled with an inorganic metal filler which is any polyvalent inorganic metal oxide, hydroxide or salt which reacts with the acid moiety of an ethylene-acid copolymer which comprises incorporating a copolymer of ethylene and an alpha-, beta-ethylenically unsaturated carboxylic acid into a melt blend consisting essentially of of the polyolefin and the inorganic metal filler.

9. The method of claim 8 wherein the copolymer is ethylene-acrylic acid.

10. The method of claim 1 wherein the polyolefin is selected from the group consisting of ethylene homopolymers, polypropylene, linear low density polyethylenes and mixtures thereof.

11. The method of claim 10 wherein the inorganic metal filler is an oxide, carbonate or hydroxide of a Group II metal of the periodic table.

12. The method of claim 11 wherein the copolymer is ethylene-acrylic acid containing from about 2.5 to about 20 weight percent acrylic acid.

* * * * *